(12) United States Patent
Tsengas

(10) Patent No.: US 8,851,013 B2
(45) Date of Patent: Oct. 7, 2014

(54) COMPOSITE COVERED BOWLS SUCH AS PET FOOD AND WATER BOWLS

(71) Applicant: OurPet's Company, Fairport Harbor, OH (US)

(72) Inventor: Steven Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 0 days.

(21) Appl. No.: 14/082,463

(22) Filed: Nov. 18, 2013

(65) Prior Publication Data

US 2014/0076240 A1    Mar. 20, 2014

Related U.S. Application Data

(60) Continuation of application No. 12/688,981, filed on Jan. 18, 2010, now Pat. No. 8,286,589, and a division of application No. 13/651,612, filed on Oct. 15, 2012, which is a continuation of application No. 12/049,962, filed on Mar. 17, 2008, now abandoned, which is a continuation of application No. 11/067,046, filed on Feb. 28, 2005, now abandoned, which is a continuation of application No. 10/616,282, filed on Jul. 10, 2003, now abandoned, which is a continuation of application No. 09/813,746, filed on Mar. 21, 2001, now abandoned.

(60) Provisional application No. 60/193,963, filed on Mar. 31, 2000.

(51) Int. Cl.
| | |
|---|---|
| *A01K 5/01* | (2006.01) |
| *A01K 7/00* | (2006.01) |
| *B29C 65/48* | (2006.01) |

(52) U.S. Cl.
CPC ............... *A01K 5/0114* (2013.01); *B29C 65/48* (2013.01); *A01K 7/00* (2013.01)
USPC ........................................ 119/61.3; 119/61.56

(58) Field of Classification Search
CPC ..... A01K 5/0114; A01K 5/0128; A01K 7/00; A47G 23/03; A47G 19/2261; A47G 19/02; Y10S 220/19; Y10S 220/912; A47J 41/00; B29C 65/48
USPC .................. 119/61.56, 61.54, 61.5; D30/129; 220/574, 9.4, 23.91
See application file for complete search history.

(56) References Cited

U.S. PATENT DOCUMENTS

| | | | | |
|---|---|---|---|---|
| 1,517,978 | A * | 12/1924 | Giese ......................... | 220/62.18 |
| 1,959,262 | A * | 5/1934 | Colabrese ..................... | 220/632 |
| 1,985,558 | A * | 12/1934 | Alexander .................... | 220/632 |
| 2,731,056 | A * | 1/1956 | Anson .......................... | 16/86 A |
| 3,991,719 | A * | 11/1976 | Bruce .......................... | 119/61.5 |
| 4,798,173 | A * | 1/1989 | Wilgren ..................... | 119/61.52 |
| 4,803,954 | A * | 2/1989 | Welch et al. ............... | 119/61.53 |

(Continued)

*Primary Examiner* — Yvonne Abbott
(74) *Attorney, Agent, or Firm* — John D. Gugliotta

(57) ABSTRACT

A cover for a bowl, such as a pet food or water bowl, that comprises a lower cover molded on or affixed to the lower surface of a bowl, and a plastic decorative outer sleeve secured to the outer surface of the bowl and held in place by the lower cover. The outer cover provides aesthetically pleasing exterior features. The lower cover provide skid resistance properties, being fabricated from rubber or plastic secured to the lower outer surface of the metallic bowl.

19 Claims, 5 Drawing Sheets

(56) References Cited

U.S. PATENT DOCUMENTS

| | | | |
|---|---|---|---|
| 5,158,193 A * | 10/1992 | Chen | 215/386 |
| 5,413,302 A * | 5/1995 | Ferster | 248/346.11 |
| 5,467,733 A * | 11/1995 | Messina | 119/464 |
| 5,485,937 A * | 1/1996 | Tseng | 220/571 |
| 5,579,946 A * | 12/1996 | Rowan et al. | 220/592.27 |
| 5,842,675 A * | 12/1998 | Davitt | 248/346.5 |
| 5,979,361 A * | 11/1999 | Willinger | 119/61.54 |
| 5,992,671 A * | 11/1999 | Wardani | 220/293 |
| D423,733 S * | 4/2000 | Choi et al. | D30/129 |
| D453,284 S * | 2/2002 | O'Connor et al. | D7/608 |
| 6,431,389 B1 * | 8/2002 | Jerstroem et al. | 220/574.3 |
| 6,516,747 B1 * | 2/2003 | Willinger | 119/61.54 |
| 6,578,809 B1 * | 6/2003 | Dimella | 248/346.11 |
| RE39,391 E * | 11/2006 | Jerstroem et al. | 220/574.3 |
| D564,711 S * | 3/2008 | Modi et al. | D30/129 |
| D565,253 S * | 3/2008 | Modi et al. | D30/129 |
| D602,651 S * | 10/2009 | Modi et al. | D30/129 |
| 7,614,523 B1 * | 11/2009 | Fixler et al. | 220/738 |
| D613,125 S * | 4/2010 | Sierra et al. | D7/584 |
| D613,556 S * | 4/2010 | Sierra et al. | D7/584 |
| D636,944 S * | 4/2011 | Anderson et al. | D30/129 |
| 8,286,589 B1 * | 10/2012 | Tsengas | 119/61.56 |
| 8,770,434 B2 * | 7/2014 | Shearer | 220/603 |

* cited by examiner

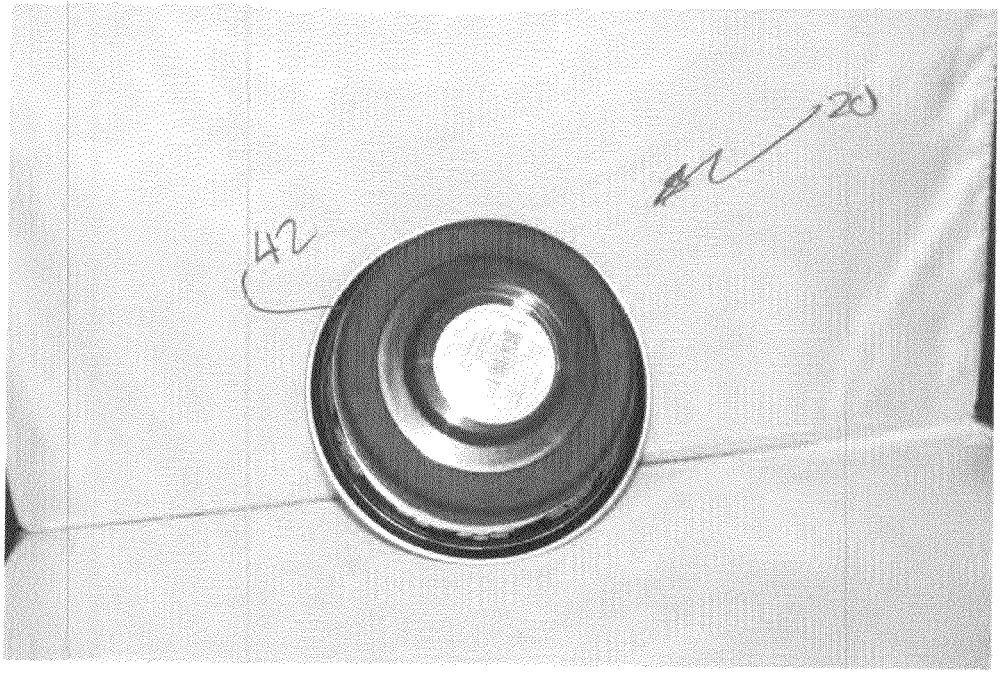

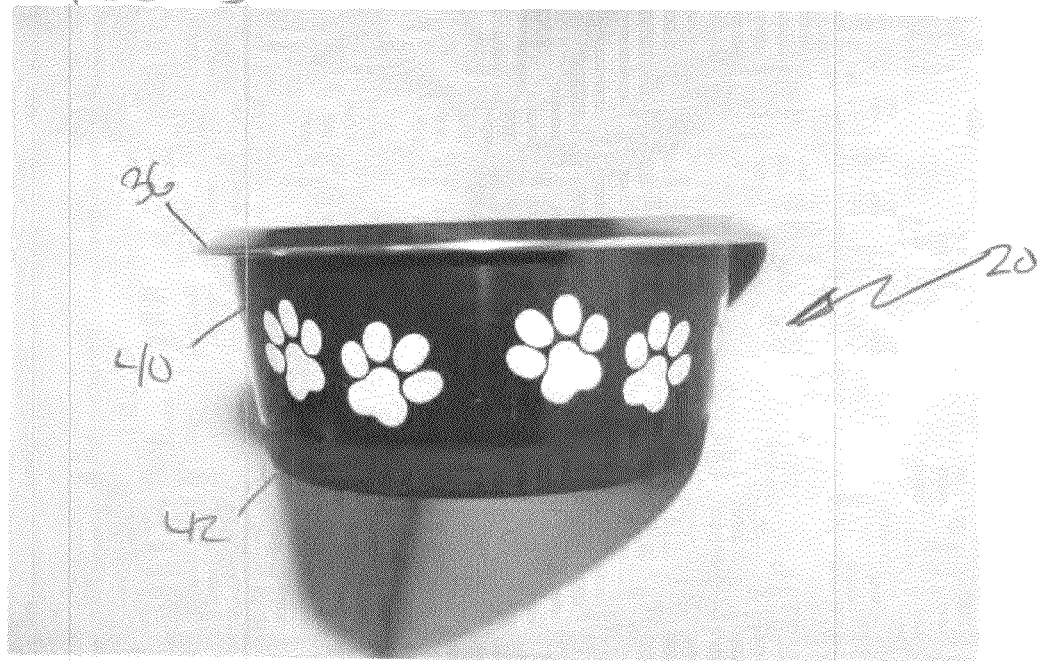
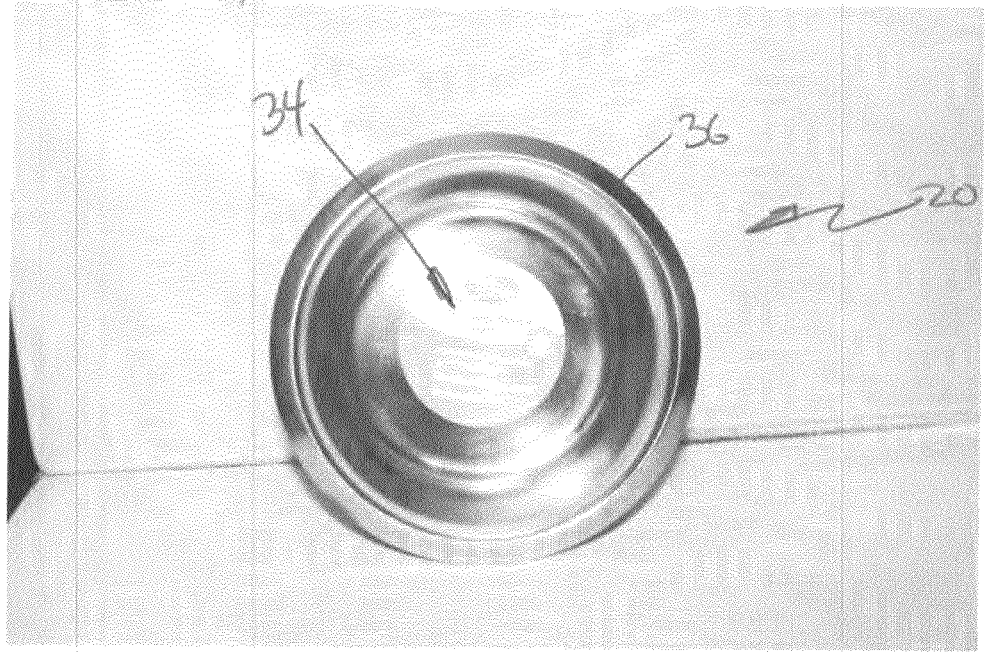

COMPOSITE COVERED BOWLS SUCH AS PET FOOD AND WATER BOWLS

RELATED APPLICATIONS

The present application is a Continuation-in-Part of U.S. Non-provisional patent application Ser. No. 13/651,612, filed on Oct. 15, 2012, which was a Continuation in Part of U.S. Pat. No. 8,286,589 filed on Oct. 18, 2010, which was a Continuation-in-Part of U.S. Non-Provisional patent application Ser. No. 12/049,962, which was a Continuation-in-Part of U.S. Non-Provisional patent application Ser. No. 11/067,046, filed on Feb. 28, 2005, which is a Continuation-in-part of U.S. Ser. No. 10/616,282, filed on Jul. 10, 2003, which was a Continuation-in-Part of U.S. Ser. No. 09/813,746, filed on Mar. 21, 2001, which was a conversion of U.S. Provisional Application Ser. No. 60/193,963, filed on Mar. 31, 2000, wherein the present application claims a benefit of the priority filing date of Mar. 31, 2000.

BACKGROUND OF THE INVENTION

1. Field of the Invention

The present invention relates generally to new and novel improvements in pet food and water bowls and, more particularly, to covered pet food and/or water bowl that includes a stainless steel pet inner feeder surface, a decorative plastic outer surface, and a non-skid lower surface.

2. Description of the Related Art

Pet food and water bowls of many types have existed commercially for quite some time. The use of stainless steel in the manufacturing of such bowls as become popular due to their durability, ease of cleaning and relative value, with the price of such bowls having been reduced greatly over the years with increasing supply. However, given the relative hardness of stainless steel pet feeders made from this material have a tendency to move or slide about on smooth flooring surfaces. Such movement can cause distraction or frustration to the pet while feeding, and can additionally cause noise on or scratching of smooth surface floors.

While rubber or elastomeric covers have been made that removably affix to the lower surface of some bowl designs, while providing an aesthetically pleasing appearance, such removable covers create an impediment when it comes to cleaning of such bowls, with consumers rejecting such designs due to their inability to be machine washable as well as becoming a weak nondurable element of such a combination.

Additionally, tastes in consumer preferences tend to change over time, requiring product aesthetics to be updated on an ongoing basis. The use of stainless steel bowls have been available now for a little over a decade, but provide for little option to evolve a new color, style or overall product "look" without significant manufacturing difficulties or increased product cost.

Consequently, a need has been felt for a pet feeder having a stainless steel inner surface, a decorative plastic outer surface, and with nonskid rubber bottoms permanently affixed thereto in order to prevent slipping, skidding and noise, while at the same time allowing for the entire assembly to be durable and machine washable.

SUMMARY OF THE INVENTION

It is therefore an object of the present invention to provide an improved pet bowl having a covered outer and lower surface.

It is another object of the present invention to provide a pet bowl incorporating a covered lower surface that minimizes and substantially precludes the bowl from slipping and sliding along or across a surface, such as a floor, upon which it is placed.

It is yet another object of the present invention to provide a pet bowl incorporating a decorative plastic-clad outer surface that provides a pallet for decorative and design elements or changes in such elements overt time, while at the same time maintaining the benefits of having a stainless steel inner surface for contacting animal food or water.

It is a further feature of the present invention to provide a pet food or drinking bowl that includes covered outer and lower surfaces that can provide some level of insulation for the contents of the bowl placed therein.

Briefly described according to the preferred embodiment of the present invention, the aforementioned objects of the present invention are attained by a metallic pet feeding bowl having a nonmetallic, non-skid cover secured on the lower exterior surface of a pet food or drink bowl. Further, a non-metallic, decorative cover sleeve is clad over the outer sidewall of the metallic bowl and secured by impingement between the lover cover and an upper peripheral rim of the bowl. The pet bowl may be formed of stainless steel. The nonmetallic lower cover may be formed of an elastomeric or rubber material that is secured to the lower outer surface by bonding, vulcanizing, dip molding, adhesive attachment or the like. The lower cover may also be manufactured by various other known means for shaping plastic or rubber type materials. The nonmetallic cover sleeve may be formed of various plastic materials and may provide a pleasing aesthetic appearance. The lower and outer covers can be formed directly in contact with the bowl's outer and lower surfaces, or can be pre-fabricated to a shape substantially formed to the shape of the bowl to fit over the lower and outer surface of the bowl, respectively, prior to it being affixed or adhered thereto. In the preferred embodiment the outer cover has an annular shape that is form fitting to the outside shape of the bowl sidewall, and the lower cover adheres to and covers only the lower peripheral outer circumference of the bowl's bottom surface. However, in an alternate embodiment the lower cover has a disc-like shape to cover the entire lower outer surface of the bowl. The material selection, position, shape and overall fabrication and attachment of the lower cover is intended to provide frictional resistance to substantially prevent the bowl from slipping, sliding or otherwise moving during use by the pet, and further preventing scratching, scarring and annoying noises that may result from sliding on a floor. Finally, if formed of sufficient thickness the lower and outer covers may provide a certain degree of insulation to the contents placed within the bowl.

Other advantages and novel features of the present invention will become apparent in the following detailed description of the invention when considered in conjunction with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a photograph showing a bottom plan view thereof;

FIG. 4 is a photograph showing an alternate, enlarged front top perspective view thereof;

FIG. 5 is a photograph showing a side elevation view thereof;

FIG. 6 is a photograph showing a top plan view thereof;

DESCRIPTION OF THE PREFERRED EMBODIMENTS

Figure 1:
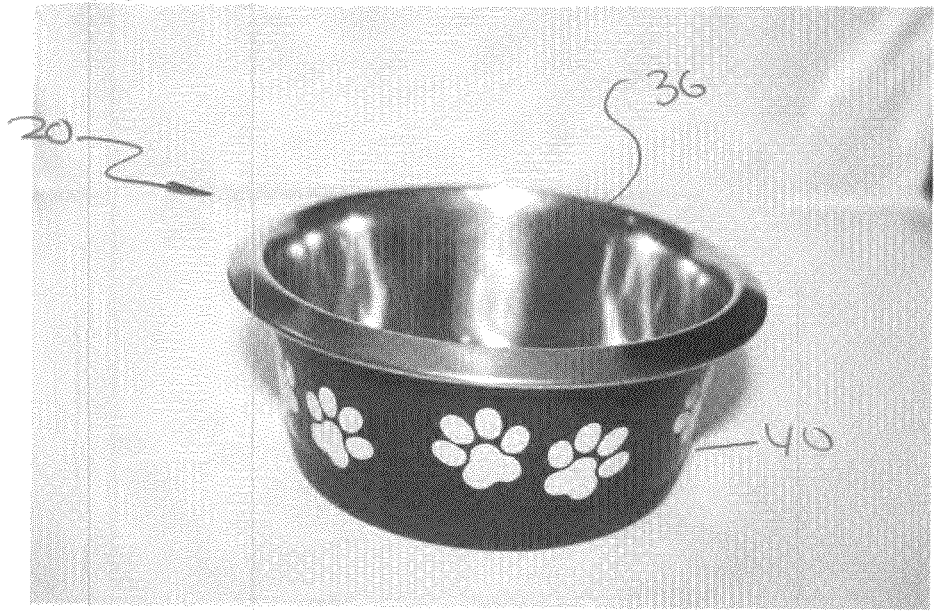
FIG. 1 is a photograph showing a front top perspective view of an animal feeder or drinking containers having a covered outer and lower surface according to the preferred embodiment of the present invention.
Figure 2:
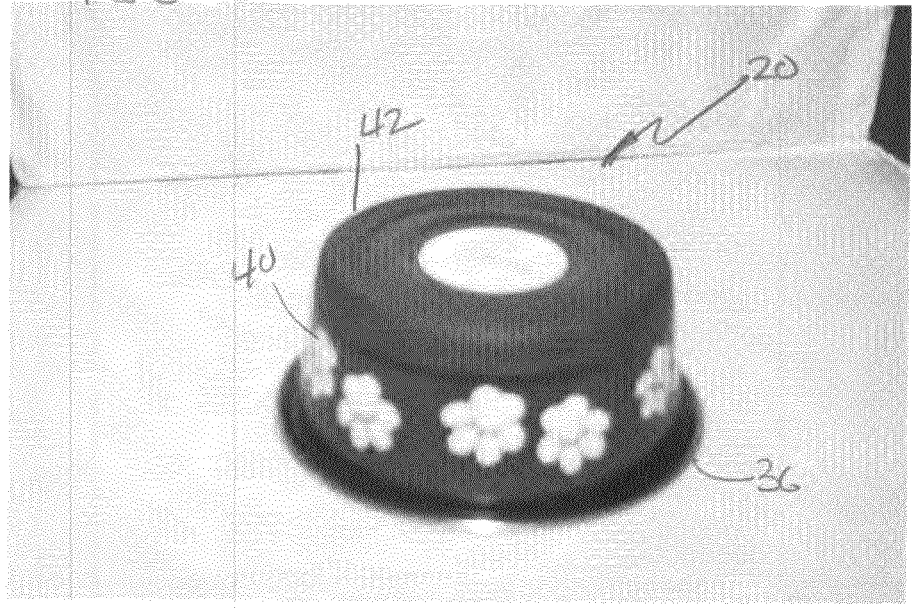
FIG. 2 is a photograph showing a front bottom perspective view thereof.
Figure 7:
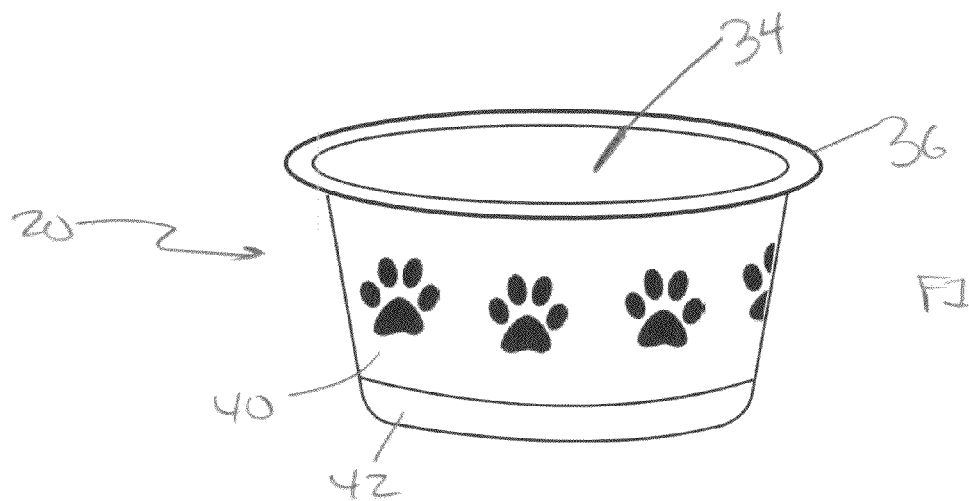
FIG. 7 is a schematic representation showing of an animal feeder or drinking containers having a covered outer and lower surface according to the preferred embodiment of the present invention.
Figure 8:
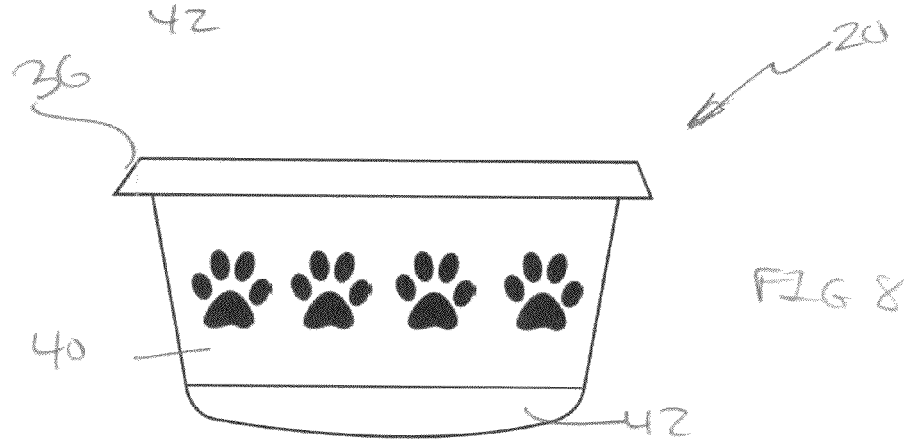
FIG. 8 is a schematic representation showing a side elevational of FIG. 7.
Figure 9:
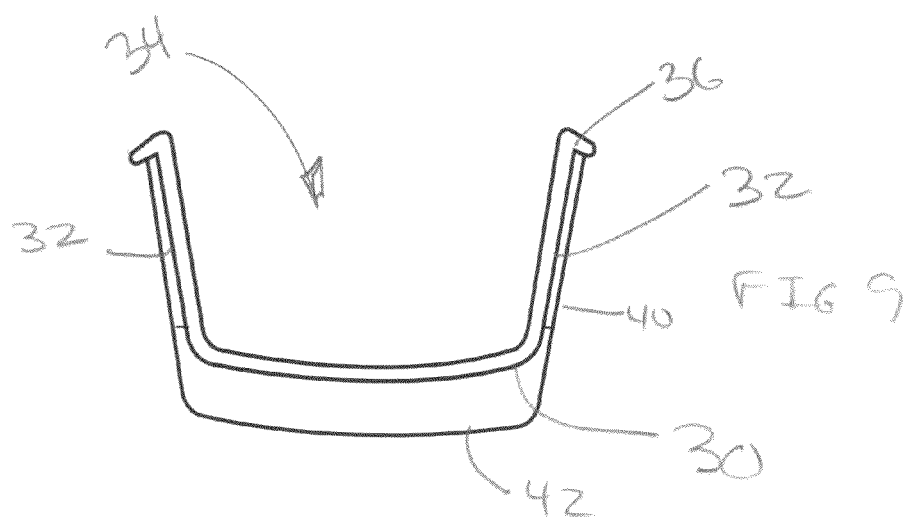
FIG. 9 is a schematic representation showing a cross sectional elevational view taken along the radial centerline of FIG. 8.
Figure 10:
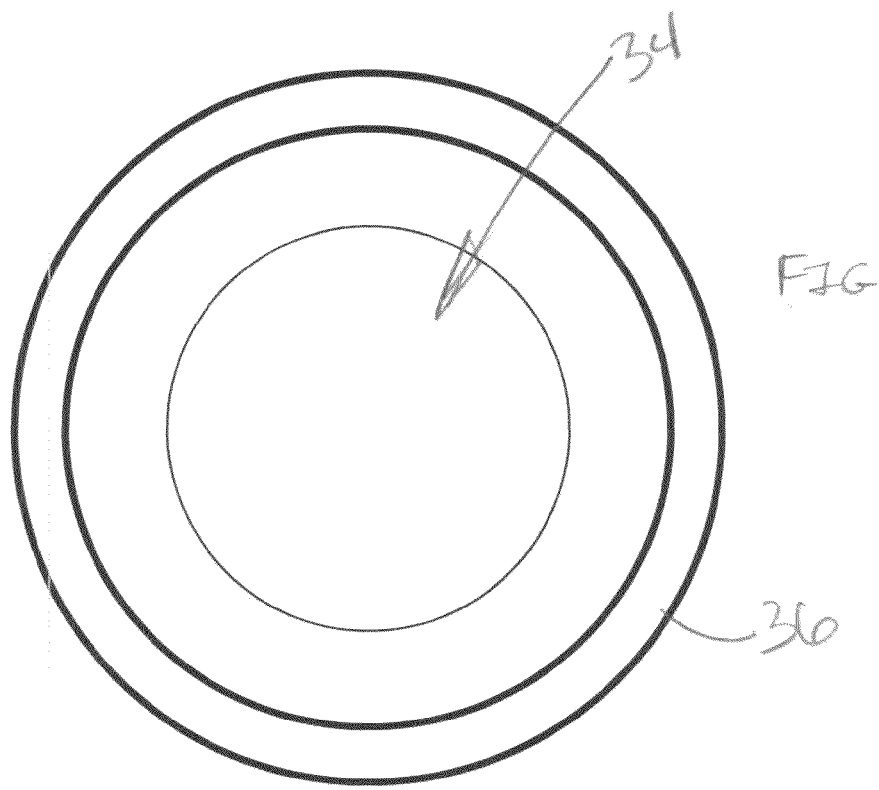
FIG. 10 is a schematic representation showing a top plan view thereof.
Figure 11:
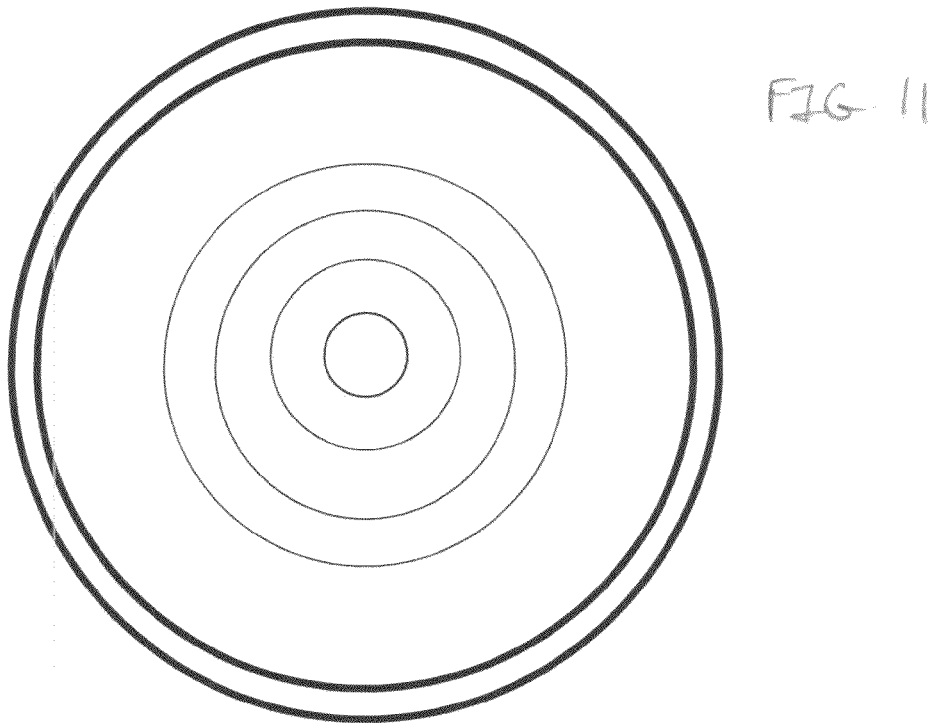
FIG. 11 is a schematic representation showing a bottom plan view thereof.

The best mode for carrying out the invention is presented in terms of its preferred embodiment, herein depicted within FIGS. 1 through 11.

1. Detailed Description of the Figures

Referring now to FIG. 1 through FIG. 11, a pet food or drinking bowl 20 is shown in accordance with a preferred embodiment of the present invention. It is envisioned that the bowl 20 may be formed in a manner similar to otherwise conventional metallic (i.e. stainless steel) pet food or water bowl in which a generally concave outer surface 30 is formed circumscribed by an upwardly directed sidewall 32 and forming a container volume 34 adapted for functioning as a small animal feeder or drinking container. The sidewall 32 is intended to be generally outwardly sloped, such as to form an access opening that is wider at top than at the bottom. Further, the sidewall 32 is terminated at its uppermost surface by a circumscribing flanged upper rim 36.

While the bowl 20 may be formed in a manner similar to otherwise conventional metallic (i.e. stainless steel) bowl, additional innovative features include an outer cover 40 and a lower cover 42. The outer cover 40 is intended as being a nonmetallic, decorative sleeve that is sized and shaped such as to fit conformingly over a least a part of the outer sidewall of the metallic bowl. The nonmetallic lower cover 42 is intended as being formed of an elastomeric or rubber material that is secured to the lower outer surface by bonding, vulcanizing, dip molding, adhesive attachment or the like. The lower cover may also be manufactured by various other known means for shaping plastic or rubber type materials. The nonmetallic outer cover sleeve 40 may be formed directly in contact with the bowl's outer and lower surfaces, or can be pre-fabricated to a shape substantially formed to the shape of the bowl to fit over the outer surface of the bowl. In such an arrangement, the outer cover sleeve 40 is secured in place by being impinged between the outer peripheral rim 36 and the lower cover 42.

Further, the outer cover sleeve 40 may be formed of various plastic materials and may provide a pleasing aesthetic appearance. Further still, a variety of materials, colors, textures, shapes and design elements may be incorporated in or on the outer cover sleeve 40 in a manner that eases the manufacturability and lowers the cost, as compared to attempting to incorporate similar elements directly into or on to the bowl's metallic outer sidewall 32.

In the preferred embodiment the lower cover 42 has an disc-like shape that is form fitting to the entire outside shape of the bowl's lower surface. However, it is anticipated that the lower cover 42 may also be formed such as to have an annular, ring-like shape that adheres to and covers only the lower peripheral outer circumference of the bowl's bottom surface.

The material selection, position, shape and overall fabrication and attachment of the lower cover is intended to provide frictional resistance to substantially prevent the bowl from slipping, sliding or otherwise moving during use by the pet, and further preventing scratching, scarring and annoying noises that may result from sliding on a floor. Finally, if formed of sufficient thickness the lower and outer covers 40, 42 may provide a certain degree of insulation to the contents placed within the bowl.

As should be obvious to a person having ordinary skill in the relevant art, in light of the present teachings, various alternate embodiments and/or design choices may be made for both the bowl 20 and the covers 40, 42 as well as the attachment there between. The lower cover 40 can be shaped such as to adhere only to the lower peripheral outer circumference of the bowl's bottom surface, but may be provided having various heights, widths and thicknesses, as well as being available with various functional or aesthetic contours.

2. Operation of the Preferred Embodiment

To use the present invention, in accordance with a preferred embodiment of the present invention, a lower cover 42 is placed upon a bottom surface of a metallic bowl to provide protection to the bowl, reduce slipping and sliding of the bowl during use by a pet, and to possibly provide insulating properties to the contents of the bowl 20. The cover 42 may be fabricated onto the bowl 20 during manufacture of the cover, or may be affixed thereto as a secondary operation after being prefabricated. Prior to afixing the lower cover 42, an outer cover 40 in the form of an annular sleeve is placed fittingly over the outer peripheral sidewall 32. The outer cover 42 is thereby impinged in place between the bowl's upper peripheral rim 36 and the lower cover 42.

The foregoing descriptions of specific embodiments of the present invention have been presented for purposes of illustration and description and are not intended to be exhaustive or to limit the invention to the precise forms disclosed. Obviously many modifications and variations are possible in light of the above teaching. The embodiments were chosen and described in order to best explain the principles of the invention and its practical application, and enable others skilled in the art to best utilize the invention and various embodiments. It is intended that the scope of the invention be defined by the Claims appended hereto and their equivalents. Therefore, the scope of the invention is to be limited only by the following claims.

What is claimed is:

1. An animal feeder or drinking container substantially comprising:

a bowl formed of stainless steel or other metal, said bowl having a generally concave exterior lower outer surface circumscribed by an outwardly angular upwardly directed sidewall forming a containment volume for animal food or drink;

an upper peripheral rim formed about an upper opening of said bowl;

an outer cover circumscribing at least a portion of an exterior outer surface of said bowl; and a lower cover secured to at least a portion of an outer lower surface of said bowl in a manner such that said lower cover remains affixed to said bowl during use.

2. The animal feeder or drinking container of claim 1, wherein said outer cover further comprises an annular sleeve formed to fittingly align about the outer sidewall and extending between said lower cover and said upper peripheral rim.

3. The animal feeder or drinking container of claim 2, wherein the cover cover terminates at an upper portion opposite the bottom surface that is coextensive with and circumscribes the outer surface of said bowl.

4. The animal feeder of claim 1, wherein said outer cover is formed having at least one design element selected from the group consisting of: color; shape; material; and images.

5. The animal feeder of claim 4, wherein said lower cover is formed of a material capable of providing resistance to the bowl so as to substantially reduce slipping and/or sliding along a floor or other surface upon which the bowl is placed.

6. The animal feeder of claim 5, wherein:
said lower cover is formed of a rubber material; and
said outer cover is formed of a plastic material.

7. The animal feeder of claim 1, wherein said lower cover is formed of a material capable of providing resistance to the bowl so as to substantially reduce slipping and/or sliding along a floor or other surface upon which the bowl is placed.

8. An animal feeder or drinking container substantially comprising:
a bowl formed of stainless steel or other metal, said bowl having a generally concave exterior lower outer surface circumscribed by an outwardly angular upwardly directed sidewall forming a containment volume for animal food or drink;

an upper peripheral rim formed about an upper opening of said bowl;

an outer cover circumscribing at the entire exterior outer surface of said bowl; and a lower cover secured to at least a portion of an outer lower surface of said bowl in a manner such that said lower cover remains affixed to said bowl during use.

9. The animal feeder or drinking container of claim 8, wherein said outer cover further comprises an annular sleeve formed to fittingly align about the outer sidewall and extending between said lower cover and said upper peripheral rim.

10. The animal feeder or drinking container of claim 9, wherein the lower cover terminates at an upper portion opposite the bottom surface that is coextensive with and circumscribes the outer surface of said bowl.

11. The animal feeder of claim 8, wherein said outer cover is formed having at least one design element selected from the group consisting of: color; shape; material; and images.

12. The animal feeder of claim 11, wherein said lower cover is formed of a material capable of providing resistance to the bowl so as to substantially reduce slipping and/or sliding along a floor or other surface upon which the bowl is placed.

13. The animal feeder of claim 12, wherein:
said lower cover is formed of a rubber material; and
said outer cover is formed of a plastic material.

14. The animal feeder of claim 8, wherein said lower cover is formed of a material capable of providing resistance to the bowl so as to substantially reduce slipping and/or sliding along a floor or other surface upon which the bowl is placed.

15. The animal feeder of claim 8, wherein said lower cover circumscribes and covers only a portion of the exterior lower surface of said bowl.

16. The animal feeder of claim 8, wherein said lower cover circumscribes and covers the entire exterior lower surface of said bowl.

17. A process for making an animal feeder of claim 1 comprising:
a. Forming a circumscribing outer sleeve for fittingly covering said exterior outer surface of said bowl;
b. Placing said outer sleeve over said exterior outer surface of said bowl fittingly against said upper peripheral rim;
c. Forming a pliable polymeric or rubber material selectively to the shape of at least part of an outer surface of said animal feeder bowl;
d. Adapting a selective portion of said animal feeder bowl to facilitate securing said pliable polymeric or rubber material to said bowl; and
e. Securing said pliable polymeric or rubber material selectively to said selective portion of said animal feeder bowl such as to impinge in place said outer sleeve about the outer surface of said bowl.

18. The process of claim 17, wherein said animal feed bowl is formed of stainless steel or other metal.

19. The process of claim 17, wherein said process of securing said pliable polymeric or rubber material to said animal feeder bowl comprises placing an adhesive between said pliable polymeric or rubber material and said animal feeder bowl.

* * * * *